(12) United States Patent
Yoakim et al.

(10) Patent No.: US 9,668,604 B2
(45) Date of Patent: Jun. 6, 2017

(54) CAPSULE SYSTEM FOR THE PREPARATION OF BEVERAGES BY CENTRIFUGATION

(75) Inventors: Alfred Yoakim, St-Legier-la Chiesaz (CH); Jean-Paul Denisart, La Conversion (CH); Antoine Ryser, Lausanne (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 58 days.

(21) Appl. No.: 13/391,348

(22) PCT Filed: Aug. 25, 2010

(86) PCT No.: PCT/EP2010/062366
§ 371 (c)(1),
(2), (4) Date: Feb. 20, 2012

(87) PCT Pub. No.: WO2011/023711
PCT Pub. Date: Mar. 3, 2011

(65) Prior Publication Data
US 2012/0171334 A1      Jul. 5, 2012

(30) Foreign Application Priority Data

Aug. 28, 2009  (EP) .................................... 09168885
Apr. 19, 2010  (EP) .................................... 10160249

(51) Int. Cl.
*A47J 31/22*      (2006.01)
*A23F 5/26*       (2006.01)
(Continued)

(52) U.S. Cl.
CPC .............. *A47J 31/22* (2013.01); *A23F 5/262* (2013.01); *A47J 31/002* (2013.01);
(Continued)

(58) Field of Classification Search
CPC ...... A47J 31/22; A47J 31/0673; A47J 31/407; A47J 31/3695; A47J 31/36; B65D 85/8043
(Continued)

(56) References Cited

U.S. PATENT DOCUMENTS 239,659 A    4/1881   Houston et al.
1,963,476 A  6/1934   Smith
(Continued)

FOREIGN PATENT DOCUMENTS

BE   894031    2/1983
DE   3241606   3/1984
(Continued)

OTHER PUBLICATIONS

International Search Report for PCT/EP2010/062366, mailing date Nov. 23, 2010—3 pages.

*Primary Examiner* — Drew Becker
*Assistant Examiner* — Bryan Kim
(74) *Attorney, Agent, or Firm* — K&L Gates LLP

(57) ABSTRACT

A capsule system for preparing beverages by centrifugation of a capsule in a centrifuging brewing device comprising: a set of different capsules (1A, 1B; 1C, 1D; 1E, 1F, 1G; 1H, 1I; 1J,1K, 1L); each one for selectively delivering a beverage having specific characteristics that differ from the other capsules of the set; each capsule of the set comprising a body (2) with a sidewall and a free rim (3), an upper wall (4) and an extractable or infusible ingredient; and an insertion diameter (D) of the body of the capsule for insertion in a rotary capsule holder (14) of the centrifuge brewing device (7) in a referential position, wherein the different capsules in the set having bodies (2) of different storage volumes (Continued)

obtained by a variable depth (d1, d2, d3) of the body in the set but the same insertion diameter (D) for all capsules of the set.

8 Claims, 6 Drawing Sheets

(51) Int. Cl.
*B65D 85/804* (2006.01)
*A47J 31/36* (2006.01)
*A47J 31/00* (2006.01)
*A47J 31/06* (2006.01)

(52) U.S. Cl.
CPC ...... *A47J 31/3676* (2013.01); *B65D 85/8043* (2013.01); *A47J 31/0668* (2013.01); *A47J 31/0673* (2013.01)

(58) Field of Classification Search
USPC ....... 426/431–436; 99/295, 302 C, 298, 299, 99/289 R, 383
See application file for complete search history.

(56) References Cited

U.S. PATENT DOCUMENTS

| | | | |
|---|---|---|---|
| 2,778,739 A | 1/1957 | Rodth | |
| 3,025,781 A | 3/1962 | Bossi | |
| 3,233,535 A | 2/1966 | Fowlie | |
| 3,566,770 A | 3/1971 | Crossley et al. | |
| 3,812,773 A | 5/1974 | Hultsch | |
| 3,967,546 A | 7/1976 | Cailliot | |
| 3,985,069 A | 10/1976 | Cavalluzzi | |
| 4,426,919 A | 1/1984 | Rhoten | |
| 4,464,982 A | 8/1984 | Leuschner et al. | |
| 4,473,002 A | 9/1984 | Leuschner et al. | |
| 4,545,296 A | 10/1985 | Ben-Shmuel | |
| 4,806,374 A | 2/1989 | Willemse | |
| 4,806,375 A | 2/1989 | Favre | |
| 4,859,337 A | 8/1989 | Woltermann | |
| 4,962,693 A | 10/1990 | Miwa et al. | |
| 5,047,252 A | 9/1991 | Liu et al. | |
| 5,265,517 A | 11/1993 | Gilbert | |
| 5,325,765 A | 7/1994 | Sylvan et al. | |
| 5,566,605 A | 10/1996 | Lebrun et al. | |
| 5,637,335 A | 6/1997 | Fond et al. | |
| 5,649,472 A | 7/1997 | Fond et al. | |
| 5,755,149 A | 5/1998 | Blanc et al. | |
| 5,948,455 A | 9/1999 | Schaeffer et al. | |
| 6,007,853 A | 12/1999 | Lesser | |
| 6,607,762 B2 | 8/2003 | Lazaris et al. | |
| 6,777,007 B2 | 8/2004 | Cai | |
| 7,216,582 B2 | 5/2007 | Yoakim et al. | |
| 7,325,479 B2* | 2/2008 | Laigneau et al. | 99/295 |
| 7,469,627 B2* | 12/2008 | Li | 99/286 |
| 7,569,243 B2 | 8/2009 | Yoakim et al. | |
| 7,770,512 B2 | 8/2010 | Albrecht | |
| 8,722,124 B2* | 5/2014 | Ozanne | A47J 31/002 426/425 |
| 2002/0048621 A1* | 4/2002 | Boyd et al. | 426/77 |
| 2003/0039731 A1* | 2/2003 | Dalton | B65D 85/8043 426/433 |
| 2005/0150390 A1 | 7/2005 | Schifferle | |
| 2005/0150391 A1* | 7/2005 | Schifferle | 99/295 |
| 2005/0158426 A1* | 7/2005 | Hu | B65D 85/8046 426/77 |
| 2005/0183578 A1* | 8/2005 | Mandralis et al. | 99/279 |
| 2005/0183581 A1* | 8/2005 | Kirschner | A47J 31/3633 99/295 |
| 2006/0110507 A1 | 5/2006 | Yoakim et al. | |
| 2007/0079708 A1 | 4/2007 | Li | |
| 2008/0302251 A1* | 12/2008 | Rijskamp et al. | 99/295 |
| 2009/0032454 A1 | 2/2009 | Rapparini | |
| 2009/0126577 A1 | 5/2009 | Ternite | |
| 2009/0136639 A1 | 5/2009 | Doglioni | |
| 2009/0155422 A1 | 6/2009 | Ozanne | |
| 2010/0064899 A1 | 3/2010 | Aardenburg | |
| 2010/0154459 A1* | 6/2010 | Skalski | A47J 31/0668 62/389 |
| 2010/0173056 A1 | 7/2010 | Yoakim et al. | |
| 2010/0176004 A1 | 7/2010 | Schneider et al. | |
| 2010/0178392 A1 | 7/2010 | Yoakim et al. | |
| 2010/0178404 A1 | 7/2010 | Yoakim et al. | |
| 2010/0186599 A1 | 7/2010 | Yoakim et al. | |
| 2010/0203198 A1 | 8/2010 | Yoakim et al. | |
| 2010/0203208 A1 | 8/2010 | Yoakim et al. | |
| 2010/0239734 A1 | 9/2010 | Yoakim et al. | |
| 2011/0041702 A1 | 2/2011 | Yoakim et al. | |
| 2011/0045144 A1* | 2/2011 | Boussemart | A47J 31/3695 426/80 |
| 2011/0189362 A1 | 8/2011 | Denisart et al. | |
| 2011/0217421 A1 | 9/2011 | Perentes et al. | |
| 2011/0244099 A1 | 10/2011 | Perentes et al. | |
| 2011/0262601 A1* | 10/2011 | Manser et al. | 426/231 |

FOREIGN PATENT DOCUMENTS

| | | |
|---|---|---|
| DE | 3529053 | 2/1987 |
| DE | 3529204 | 2/1987 |
| DE | 3719962 | 6/1988 |
| DE | 4240429 | 6/1994 |
| DE | 4439252 | 5/1996 |
| DE | 102005007852 | 8/2006 |
| EP | 0250810 | 1/1988 |
| EP | 0367600 | 5/1990 |
| EP | 0512470 | 11/1992 |
| EP | 0521187 | 1/1993 |
| EP | 0607759 | 7/1994 |
| EP | 0651963 | 5/1995 |
| EP | 0749713 | 12/1996 |
| EP | 0806373 | 11/1997 |
| EP | 1208782 | 5/2002 |
| EP | 1654966 | 5/2006 |
| EP | 1774878 | 4/2007 |
| EP | 1813333 | 8/2007 |
| EP | 2000062 | 12/2008 |
| FR | 2487661 | 2/1982 |
| FR | 2513106 | 3/1983 |
| FR | 2531849 | 2/1984 |
| FR | 2535597 | 5/1984 |
| FR | 2624364 | 6/1989 |
| FR | 2685186 | 6/1993 |
| FR | 2686007 | 7/1993 |
| GB | 1506074 | 4/1978 |
| GB | 2166644 | 5/1986 |
| GB | 2227405 | 8/1990 |
| GB | 2253336 | 9/1992 |
| GB | 2 416 480 | 2/2006 |
| WO | 9402059 | 2/1994 |
| WO | 2006082064 | 8/2006 |
| WO | 2006112691 | 10/2006 |
| WO | 2007041954 | 4/2007 |
| WO | 2007085921 | 8/2007 |
| WO | 2007110768 | 10/2007 |
| WO | 2008087099 | 7/2008 |
| WO | 2008148601 | 12/2008 |
| WO | 2008148604 | 12/2008 |
| WO | 2008148646 | 12/2008 |
| WO | 2008148650 | 12/2008 |
| WO | 2008148656 | 12/2008 |
| WO | 2008148834 | 12/2008 |
| WO | 2009050540 | 4/2009 |
| WO | 2009106175 | 9/2009 |
| WO | 2009106598 | 9/2009 |
| WO | 2009133134 | 11/2009 |
| WO | 2010026045 | 3/2010 |
| WO | 2010038213 | 4/2010 |

* cited by examiner

CAPSULE SYSTEM FOR THE PREPARATION OF BEVERAGES BY CENTRIFUGATION

CROSS REFERENCE TO RELATED APPLICATIONS

The present application is a National Stage of International Application No. PCT/EP2010/062366, filed on Aug. 25, 2010, which claims priority to European Patent Application No. 09168885.3, filed on Aug. 28, 2009, and European Patent Application No. 10160249.8, filed on Apr. 19, 2010, the entire contents of which are being incorporated herein by reference.

BACKGROUND OF THE INVENTION

The present invention relates to the preparation of beverages, in particular coffee, from capsules in a brewing device by centrifugation of the capsule.

It exists systems for preparing beverages such as coffee by forcing a liquid through ingredients contained in the capsule using centrifugal forces. A possible solution is described in WO2008/148604.

EP1208782A1 relates to a device for preparing coffee beverages from capsules of different dimensions. The volume of the capsules is obtained by extending the body of the capsule at its open side thus creating capsules of different larger diameters. As a result, the capsule adaptation in the device is complex and requires moving elements to ensure proper tightness. In a centrifuge device, this would create wearing between the device after a certain period of use and would create vibrations when the capsule is centrifuged.

In a centrifugal system, an additional risk exists to create vibrations if the capsule is not properly supported in the centrifugal device. For a set of capsules presenting different volumes and containing different amounts of ingredient, there is an increased risk of unbalance and, consequently a risk of producing vibrations. The brewing device can move when it vibrates and it may generate a very important noise. Furthermore, a lack of support in the capsule holder can cause deformation of the capsule during centrifugation and create potential failure of the container, in particular, for plastic capsules.

Therefore, there is a need for providing a capsule system that is able to deliver conveniently a wider variety of beverages, in particular coffees having different characteristics (taste, strength, crema, etc.) in the centrifuge brewing device.

BRIEF SUMMARY OF THE INVENTION

The present invention provides a solution to the aforementioned problems as well as offers additional benefits to the existing art.

For this, the invention relates to a capsule system for preparing beverages by centrifugation of a capsule in a centrifuging brewing device comprising:

a set of different capsules; each one for selectively delivering a beverage having specific characteristics that differ from the other capsules of the set; each capsule of the set comprising a body with a sidewall and a free rim, an upper wall and an extractable or infusible ingredient; and an insertion diameter (D) of the body of the capsule for insertion in a capsule holder of the brewing device in a referential position, wherein the different capsules in the set have bodies of different storage volumes obtained by a variable depth of the body in the set but the same insertion diameter (D) for all capsules of the set.

The term "insertion diameter" refers to a diameter of reference measured on the external surfaces of the body of the capsule.

Such a configuration of capsules enables to deliver a wider range of beverages, e.g., ristretto, espresso and lungo coffees (or even larger coffee volumes) in a more convenient manner. In particular, the capsules' geometrical configuration enables to accommodate in a same brewing device capsules of different volumes without requiring specific adaptations of the device.

In a mode, the different capsules in the set have at least one upper body portion having substantially the same angle or the same stepped profile in the set. The term "angle" means the angle of the portion in the axial direction (or the line of curvature in the axial direction for a non-rectilinear profile of the upper body portion) of the capsule relative to the central axis of rotation of the capsule.

The upper body portion can be, for instance, a truncated or cylindrical portion.

In mode, the body comprises a lower portion of variable length whereas the upper portion can be of constant length for all capsules in the set. The lower portion can be convex, flat or concave.

By convention, the term "upper portion" means the portion of the body closer to the free rim of the body and the term "lower portion" means the portion of the body towards the bottom of the body of the capsule.

In another mode, different capsules of the set have a body that is convex along its entire surface and has a variable depth in the set. In this mode, the upper and lower portions of the body are not distinct portions but merge together in single convex portion.

Preferably, the amount of infusible or extractable ingredient increases as a function of the storage volume (i.e., depth) of the body increasing in the set. As a result, each capsule in the set can deliver beverages of different volumes and with different characteristics. The term "characteristics" when it refers to the beverage means any attribute of the beverage making a difference such as related to its taste, strength, foam or crema, colour, etc. Such attributes can be measured by any suitable analytical measures or shown by any sensory and/or visual tests.

In particular, the different capsules contain roast and ground coffee having different roasting and/or grinding characteristics in the set. The capsules can be adapted for delivering different coffees such as ristretto, espresso, lungo, etc., or coffees of the same type but different characteristics, e.g., different taste or crema.

The capsule system further comprises an identification means associated to the different capsules in the set for identifying each capsule and adjusting brewing parameters accordingly. The adjustable parameters can be chosen amongst one or more of the following parameters: the rotational speed, the flow rate, the back-pressure at the outlet of the capsule, and/or the volume of liquid fed in the capsule. The identification means participates to deliver a wider range of beverages having differentiated characteristics (volume, taste, strength, crema, colour, etc.). The identification means are associated to control means placed in the centrifugal brewing device which control the adjustment of the said parameters, by controlling the rotational motor driving the capsule holder or/and the pump supplying liquid in the capsule.

In another feature of the invention, the brewing device comprises a rotary capsule holder with a support surface arranged for supporting a portion of the body of the capsules in the set; said portion of sidewall comprising a referencing diameter matching the insertion diameter of the capsules. For this, the support surface of the capsule holder thus comprises a referencing diameter that corresponds to the insertion diameter of the capsules in the set in order to maintain any capsule of the set in the same position of reference. This same position can be determined, e.g., by a position of reference of the free rim of the body of the capsule along a reference plane (P) before closure of the brewing unit. Furthermore, the support surface of the capsule holder holds an upper portion of the body of the different capsules in the set whereas providing no support for a lower portion of the body of the capsules.

As a result, the risk of producing vibrations during centrifugation is reduced because all the capsules of the set are snugly fitted in the device with limited possible relative movement between each capsule and the device during rotation, i.e., capsule holder.

The invention also relates to a capsule for preparing a beverage by centrifugation in the rotary capsule holder of a centrifuging brewing device comprising a body with a sidewall and a free rim, an upper wall and an extractable or infusible ingredient; and an insertion diameter (D) on the body of the capsule, such insertion diameter (D) being positioned at a certain distance below the free rim of the body for matching a referencing diameter of the support surface of the rotary capsule holder and providing a self-blocking of the capsule when inserted in the capsule holder.

Preferably, the capsule comprises an upper portion extending from said diameter (D) that has an angle ($\alpha$) slightly lower than the angle ($\beta$) of the support surface of the capsule holder.

The angle ($\alpha$) of the upper portion is preferably 1 to 8 degrees, most preferably 1 to 5 degrees, lower than the angle ($\beta$) of the support portion of the capsule holder.

Such configuration enables to form a self-blocking function of the capsule in the capsule holder when the closing force is applied onto the rim of the capsule and it consequently reduces the risk of vibrations during the centrifugal process.

By convention, the "angle" refers here to the angle that the said surfaces form, in the axial direction of the capsule, with respect to the central axis of the body of the capsule, corresponding to the axis of rotation. It should be noted that the measured surfaces could not be purely rectilinear but could have a slight line of curvature without departing from the scope of the invention.

Furthermore, in addition to snugly supporting all the capsules for avoiding vibrations, the capsule holder can be hollow at its centre to be able to accommodate all capsules of the set. In another mode, the capsule holder could have a bottom wall which is deep enough to receive the longer (i.e., deeper) capsule of the set. The advantage is essentially that a unique capsule holder is sufficient to receive all the capsules of the set.

The present invention further relates to a system for brewing a beverage using a capsule which is centrifuged in a centrifugal brewing device comprising:
a set of capsules having different volumes,
identification means corresponding to different capsules of the set,
a centrifugal brewing device comprising control means capable of operating the device in centrifugation for any capsule of the set according to predetermined brewing parameters including at least one of the parameters amongst: the flow rate, the rotational speed, the volume of injected liquid in the capsule and any combinations thereof.

In particular, the control means is capable of operating the device for any capsule of the set including: the flow rate and the volume of injected liquid in the capsule.

In other words, for each capsule in the set corresponds a flow rate of reference or a profile of flow rate (e.g., any value comprised within a range between 0.2 and 10 ml/sec) and a particular volume of injected liquid (e.g., 25, 40, 120, 230 or 400 ml). Certain values of flow rates or volumes may be common for different capsules in the set.

In particular, the flow rate is controlled by varying the rotational speed and/or the back-pressure exerted on the centrifuged liquid by flow restriction means of the device and/or capsule.

For instance, for coffee beverages, the flow rate can be varied from 0.2 ml/s to 10 ml/s thereby providing a large diversity of coffee characteristics.

The flow rate is preferably controlled as a function of the volume of the capsule. Preferably, the smaller the volume, the smaller the flow rate.

The control can also be obtained by passive means such as an identifiable shape or opening characteristics of the capsule of the capsule which alters the back-pressure of the flow restriction means. For instance, capsules of different volumes in the set can be given different outlet cross-sections thereby providing different back-pressure values exerted on the centrifuged liquid.

Preferably, the system of the invention contemplates the adjustment by the control means of the volume of injected liquid and the rotational speed and, optionally the back-pressure by selective flow restriction means.

The identification means are identified by the control means to operate the device.

The identification means can be sensed by sensing means connected to the control means for an active control of the parameters or can be passive identification means, e.g., selective flow restriction means.

In particular, the identification means comprises capsule recognition means which are recognized by the sensing means connected to the control means of the brewing device which controls the brewing parameters accordingly.

The recognition means can be differentiable by a visual code such as a barcode, a colour, a sign, a logo, etc., or by a radio-frequency code (RFID), a magnetic element or by an identifiable shape.

The invention further relates to a method for brewing a beverage using a capsule which is centrifuged in a centrifugal brewing device comprising:
providing a set of capsules having different volumes,
selecting a capsule amongst the set of capsules and centrifuging said capsule in the brewing device for brewing a beverage,
wherein at least one of the following parameters: flow rate, rotational speed and volume of injected liquid is adjusted as a function of the volume of the selected capsule.

Preferably, the flow rate and the volume of injected liquid are adjusted as function of the selected volume of the capsule.

In another mode, the rotational speed and volume of injected liquid in the capsule are adjusted as a function of the volume of the selected capsule.

The method contemplates the adjustment of the flow rate by way of adjusting the rotational speed and/or the back-pressure exerted on the centrifuged liquid. In other words, the flow rate is maintained as close as possible to a set value or varied according to a preset profile, during preparation of the beverage, by adjusting the rotational speed and/or the back-pressure exerted on the centrifuged liquid.

BRIEF DESCRIPTION OF THE SEVERAL VIEWS OF THE DRAWINGS

In an alternative, the identification means can be formed as selection means of a user interface.

FIG. 1 is a schematic side view of a capsule of small volume;

FIG. 2 is a schematic side view of a capsule of larger volume but same insertion diameter;

FIG. 3 is a bottom view of the capsule of FIG. 1;

FIG. 4 is a schematic representation of the centrifugal device into which is inserted the capsule of FIG. 1;

FIG. 5 is a schematic representation of the device into which is inserted the capsule of FIG. 2;

FIG. 6 is a small capsule with a convex bottom portion;

FIG. 7 is a larger capsule with a convex bottom portion;

FIG. 8 is a small-volume capsule of convex body;

FIG. 9 is a medium-volume capsule of convex body;

FIG. 10 is a large-volume capsule of convex body;

FIG. 11 represents a centrifugal brewing device into which is inserted a capsule of small volume;

FIG. 12 represents a centrifugal brewing device into which is inserted a capsule of larger volume;

FIG. 13 represents a general representation of the manner the capsules of different volumes fit into the capsule holder according to the fifth embodiment;

FIG. 14 shows a detail of FIG. 13 before closure of the device;

FIG. 15 shows a detail of FIG. 13 after closure of the device.

DETAILED DESCRIPTION OF THE INVENTION

Figure 1:
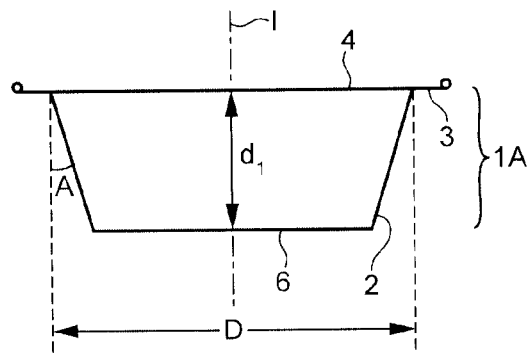
FIGS. 1 to 5 represent a first embodiment of a capsule system according to the invention.
Figure 2:
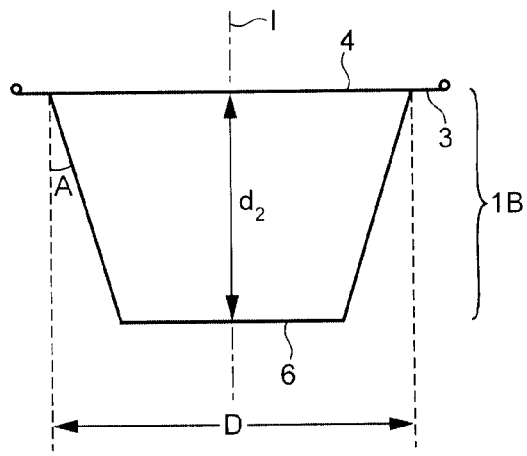
Figure 3:
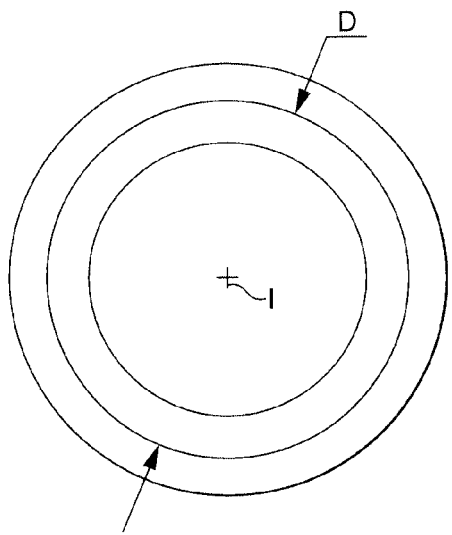

The capsule system of the present invention illustrated in FIGS. 1 to 5 comprises a set of capsules 1A, 1B of different volumes but a same insertion diameter "D". The capsule of FIG. 1 shows a small volume capsule 1A whereas the capsule of FIG. 2 shows a larger volume capsule 1B. The two capsules comprise a body 2 having a cup shape with a free rim 3 extending outwardly and a top upper wall 4. The upper wall is connected to the free rim of the body by a seal such as a heat or ultrasonic weld line. The upper wall can be a perforable membrane, a porous wall or a combination thereof. The capsules comprise a central axis "I" which represents the axis of rotation during centrifugation of the capsule in the brewing device (FIG. 3).

The volume difference between the small and large capsules is obtained particularly by varying the depth (d1, d2) of the body of the capsules in the set. In particular, the depth of the body of the smaller capsule 1A is lower than the depth of the body of the larger capsule 1B. In the present example, a single body portion of truncated form is provided which starts from the insertion diameter D and extends toward the bottom 6 of the capsule. The body portion of capsules 1A and 1B is identical and forms a same angle "A". The angle can vary from 1 to 55 degrees relative to the central axis I. The insertion diameter "D" is here determined at the line of intersection between the lower surface of the free rim 3 and the upper portion of the body.

The small volume capsule contains an amount of extraction and infusion ingredient, e.g., ground coffee, smaller than the amount for the large volume capsule. The small capsule 1A is intended for delivery of a short coffee of between 25 ml and 60 ml with an amount of ground coffee comprised between 5 and 15 grams. The larger capsule 1B is intended for delivery of a longer coffee, i.e., above 60 ml (e.g., between 80 and 500 ml) and contains an amount of ground coffee comprised between 8 and 30 grams.

Figure 4:
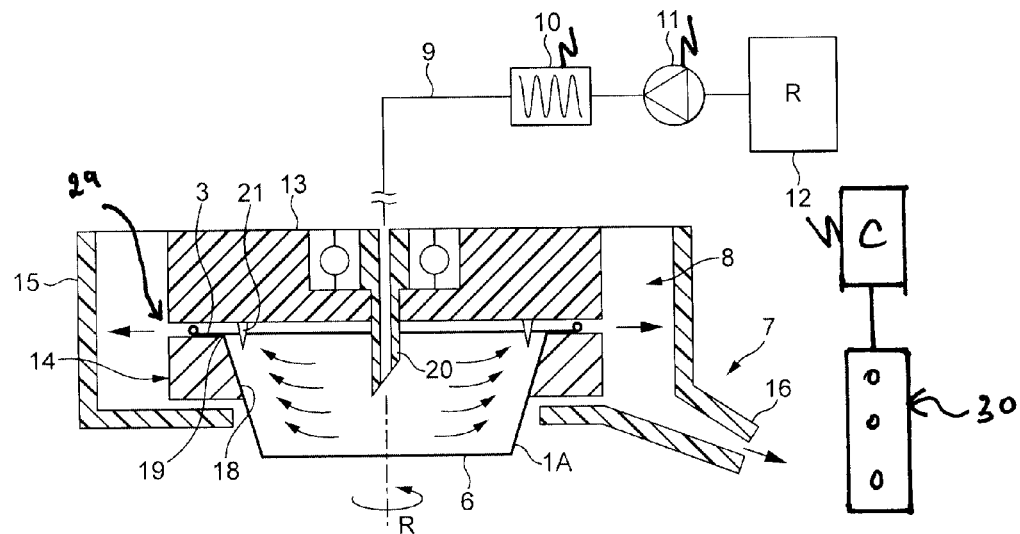
Figure 5:
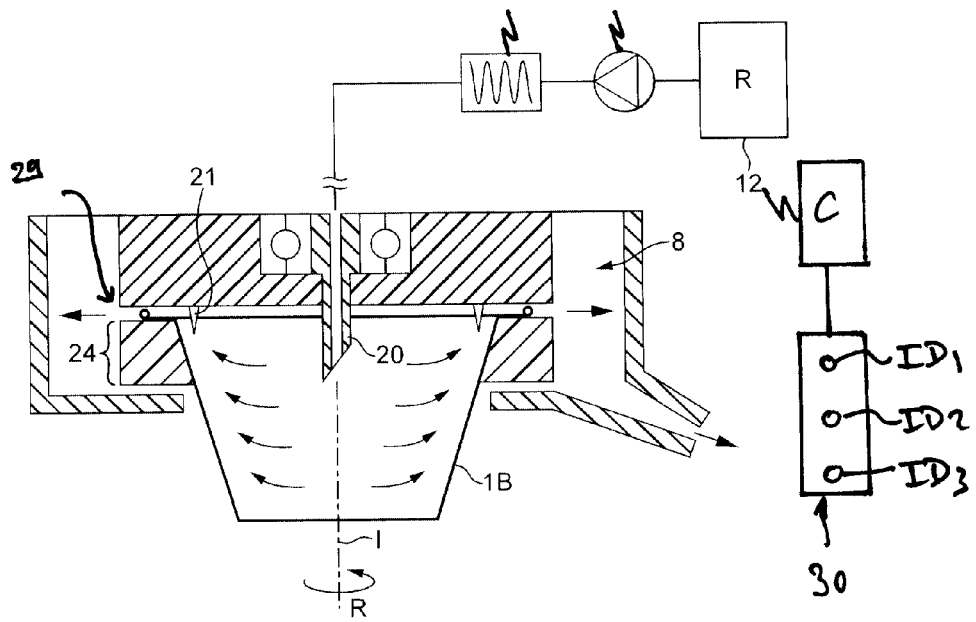

The capsules 1A, 1B are indented to be inserted in the centrifugal brewing device 7 (FIGS. 4 and 5). As illustrated in FIG. 4, the device comprises a brewing unit 8 fed with heated liquid, preferably hot water, by a fluid circuit 9 comprising a heater 10, a pump 11 for metering liquid in the capsule and a liquid supply, e.g., a water reservoir 12. The brewing unit comprises an interface assembly 13, a capsule holder 14 and a collector 15. A peripheral outlet 29, forming a flow restriction for the centrifuged liquid, is provided, at the periphery of the capsule, e.g., between the interface assembly 13 and the capsule holder or capsule 6. A flow restriction can be formed by a spring-biased valve situated at and acting on the rim of the capsule as described in WO2008/148656. Part of the valve can be formed by the capsule itself as described in co-pending European patent No. 08171069.1. Such flow restrictions provide a back-pressure on the centrifuged liquid. The collector terminates by a beverage outlet 16 such as formed as an open duct directed to the cup. The capsule holder 14 is designed with portion 24 forming a support surface 18 that is complementary shaped to the upper body portion of the capsules 1A, 1B.

In particular, the capsule holder has a referencing annular line 19 at its upper opening that forms a referencing diameter substantially equal to diameter "D" so as to ensure a snug fit of the capsule in the capsule holder without possible radial play that could provide an unbalance and, consequently, vibrations during centrifugation. The capsule also lies solidly on its upper rim onto the upper flange of the holder without the body substantially deforming radially. In this configuration, the brewing unit is closed onto the upper wall of the capsule by the interface assembly 13. The assembly 13 comprises a central injection needle 20 capable of being introduced precisely along the axis of rotation I of the capsule. At its periphery the interface assembly 13 can comprise a series of outlet perforators 21 as described in WO2008/148604 for allowing centrifuged beverage to leave the capsule through the peripheral outlet 29 between the capsule holder 14 and the interface assembly 13. A device without outlet perforators can be envisaged when the capsules have a permeable upper wall. Similarly, the injection needle can be omitted and replaced by a simple injection hole if the upper wall is also permeable. Preferably, the outlet 29 forms a flow restriction provided in the flow path of the beverage to provide a gradient of pressure in the capsule. Such restriction can be obtained by small orifices or a restriction valve such as described in WO 2008/148646.

As illustrated in FIGS. 4 and 5, the capsule holder can be hollow at its centre to allow different volumes (i.e., as obtained by bodies of variable depths) of capsule to be inserted in. The capsule holder can also have a closed or a partially closed bottom. In this case, the depth of the capsule holder is at least equal to the depth of the larger (i.e., deeper) capsule in the set, e.g., capsule 1B.

The extraction of the beverage out of the capsules 1A or 1B is obtained by driving the interface assembly 13 and capsule holder 14 together with the capsule, in rotation (R) along axis I, at relatively high speed, e.g., between 500 and 15000 rpm. The rotation is driven by a rotational motor (not shown). Liquid is forced to traverse the ingredient and leave the capsule at the upper periphery of the capsule, i.e., by outlet perforations provided in the upper wall by perforators 21. Since many perforators are placed evenly at the periphery of the upper wall, liquid can also exit by making a laminar flow of beverage dispersed radially along the whole periphery of the upper wall. The centrifuged liquid is projected between the rim of the capsule and the upper surface of the interface assembly 13 against the collector 8. The liquid beverage is then collected and dispensed through the duct 16.

Figure 6:
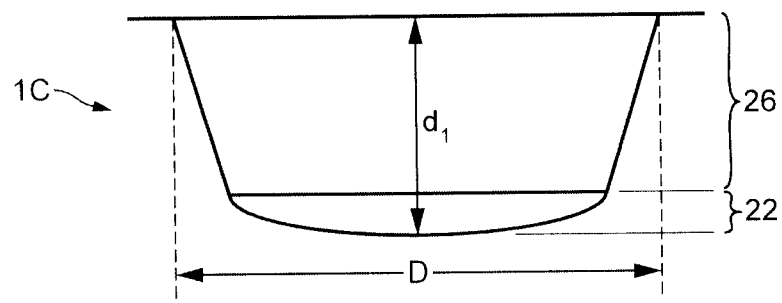
FIGS. 6 and 7 represent a second embodiment for a set of capsules belonging to the capsule system.
Figure 7:
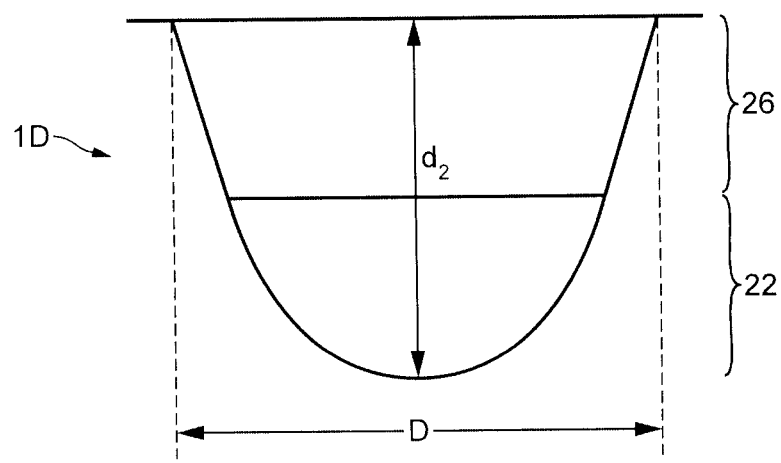

FIGS. 6 and 7 show a second embodiment for another set of capsules in which the capsules 1C, 1D comprise an upper portion 26 and a lower portion 22 of body forming an extension for varying the depth d1, d2 of the capsule. The upper portion 26 forms a truncated portion comprising the same insertion diameter D necessary for referencing the capsule in the capsule holder and a constant angle. The lower portion can have a shape different from a truncated shape and can be, as shown, a convex portion. In the larger volume capsule 1D, the depth d2 of the capsule is increased by a longer (i.e., deeper) lower portion 22. In the smaller volume capsule 1C, the depth d1 of the capsule is reduced by a shorter lower portion 22.

Figure 8:
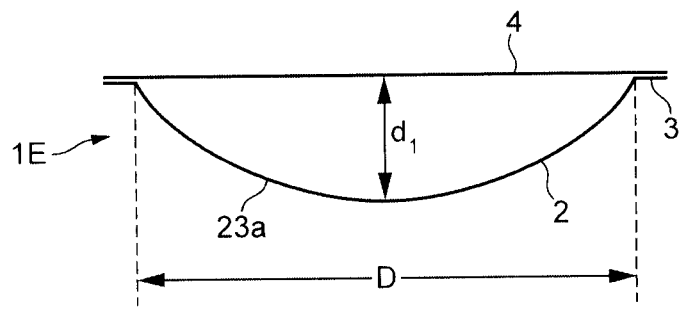
FIGS. 8 to 10 represent a third possible embodiment for a set of capsules belonging to the system.
Figure 9:
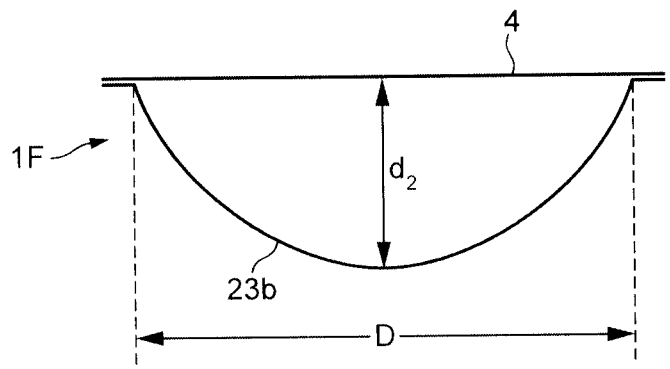
Figure 10:
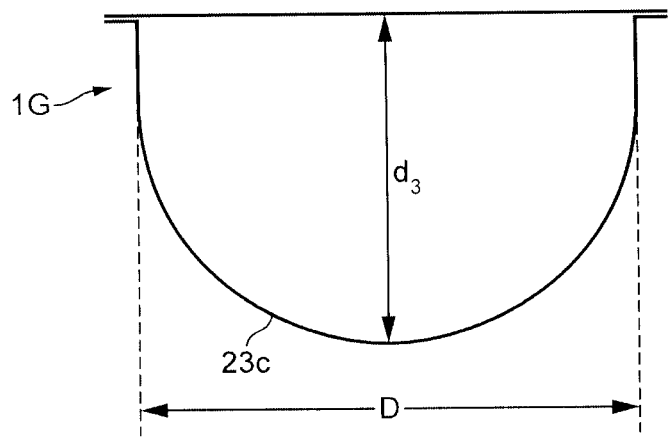

FIGS. 8, 9 and 10 show a third embodiment for another set of capsules according to the invention in which the body has a single convex portion 23a, 23b, 23c of variable depth, respectively, d1, d2, d3. The portion can be continuously convex for certain capsules of the set (e.g., capsules 1E, 1F) with no zone of truncated or cylindrical portion. The larger capsule 1G may comprise an upper portion of truncated or cylindrical portion.

Figure 11:
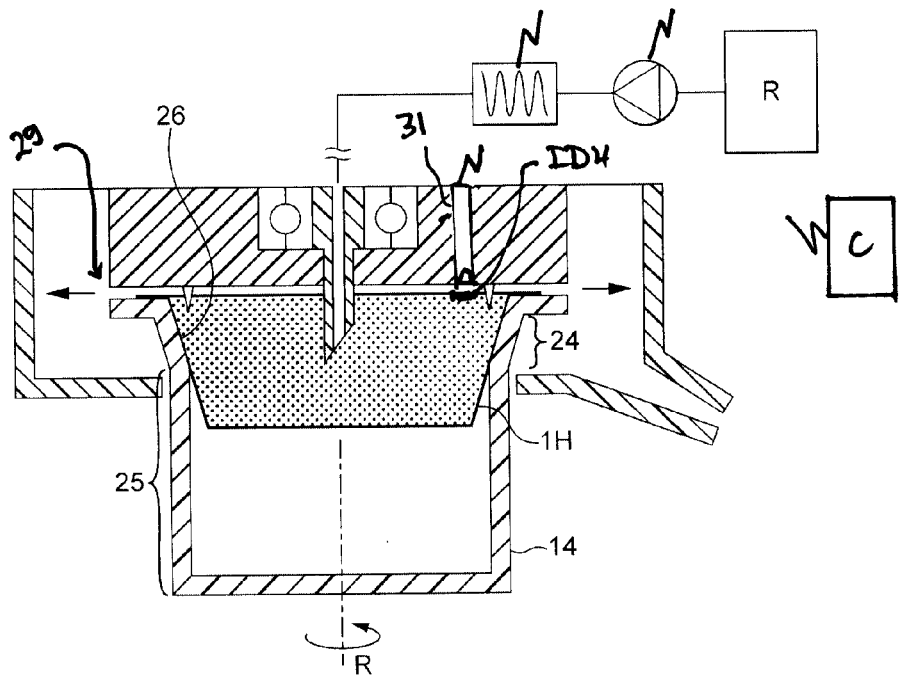
FIGS. 11 and 12 represent a fourth possible embodiment for a capsule system having another set of capsules.
Figure 12:
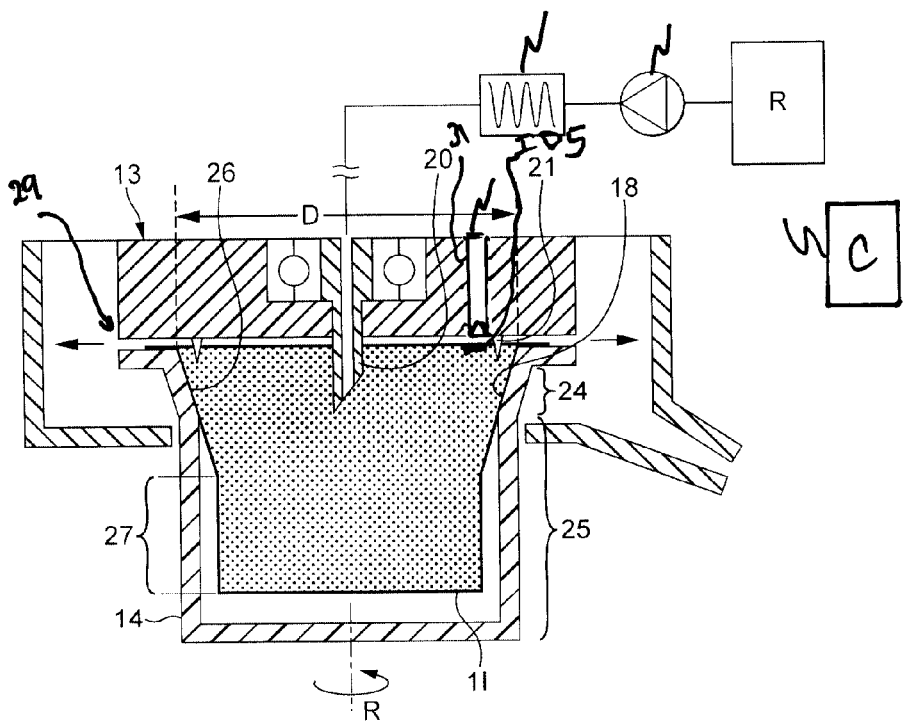

In the embodiment of FIGS. 11 and 12, the capsule holder 3 of the brewing device comprises a first portion 24 forming the support surface 18 for the upper portion 26 of the capsules and a lower portion 25 forming a closing surface below the capsule of sufficient length to accommodate both the smaller capsule 1H (FIG. 11) and the larger capsule 1I (FIG. 12). As a matter of example, the smaller capsule has a storage volume between 25 ml, the medium-size capsule has a storage volume of 30 ml and the larger capsule has a storage volume of 40 ml.

In this embodiment, the smaller and larger capsules 1H, 1I may comprise an upper portion 26, e.g., of same angle. The length of the upper portion 26 may be the same or may also slightly vary provided that it is sufficient to match the surface 18 of the capsule holder. The larger capsule 1I may comprise a lower portion 27 forming the extension portion which may be shaped with a different angle (preferably smaller relative to axis I), e.g., a trunk of cone or a cylinder of smaller diameter than the insertion diameter "D" (FIG. 12).

Of course the number of capsules of variable depth is not limited in the set in all the described embodiments.

Of course, in all the embodiments, the truncated portion can be replaced by a succession of stepped portions or another equivalent arbitrary/ornamental shape forming a reduction of diameter in direction of the bottom of the capsule which is equivalent to a continuous truncated surface.

Figure 13:
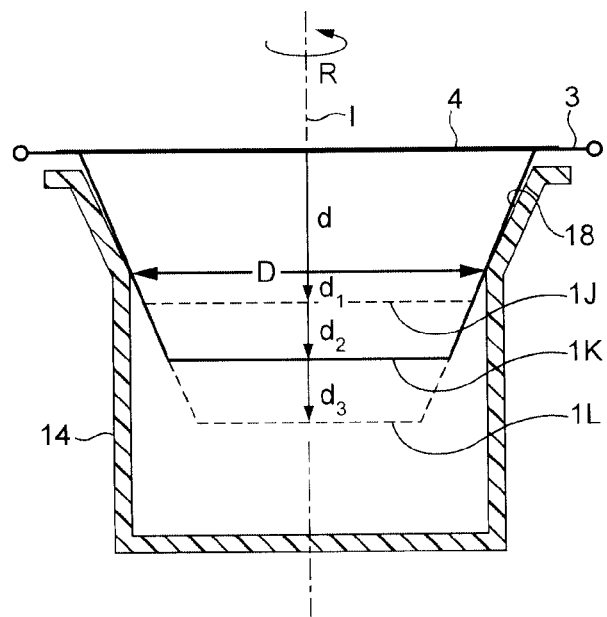
FIGS. 13 to 15 represent a fifth possible embodiment for a capsule system.
Figure 14:
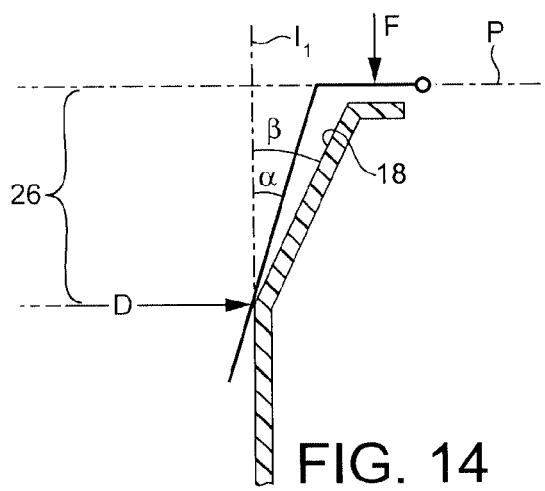
Figure 15:
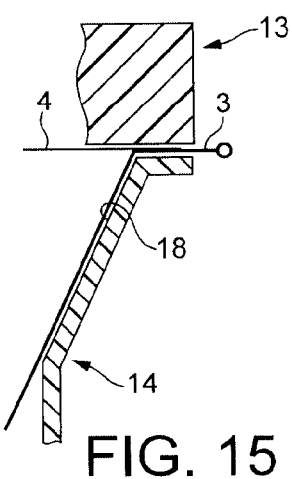

In the embodiment of FIGS. 13 to 14, contrary to the previous embodiment, the capsules of the set are referenceable in the capsule holder with an insertion diameter D which is positioned at a distance below the rim of the capsule on the upper portion of the body sidewall. The insertion diameter D is constant to all capsules in the set. Capsules of different volumes 1J, 1K and 1L are illustrated in position in the capsule holder before closure of the brewing unit (Smaller capsule 1J and deeper capsule 1L are represented in dotted lines only and medium-volume capsule 1K is represented in solid lines). As it can be noticed, all the capsules are all maintained at their insertion diameter D along a constant referencing position. More particularly, all the capsules of the set have their upper rim 3 coming along a common referencing plane P. On the contrary, the introduction depth (d1, d2, d3) of the body varies in the capsule holder 3 to adapt the volume accordingly.

In this mode, it is advantageous to design the upper portion such that its inclination angle $\alpha$ is slightly lower than the angle $\beta$ of the support surface 18. The angle is measured relative to the axis of rotation I of the capsule or a parallel axis I1 to this axis as illustrated in FIG. 14. As a result, all capsules of the set are self-blocking in the capsule holder when introduced. Therefore, when the capsule is pressed by the interface assembly 13 during closure of the brewing unit at the rim 3, the body slightly deforms to take its final rotational configuration whereas all the plays are properly compensated. The angle $\alpha$ is preferably 1 to 5 degrees lower than the angle $\beta$ of the support portion of the capsule holder.

The capsules in the set according to the invention contain roast and ground coffee having preferably different roasting and/or grinding characteristics in the set.

The coffee beans are generally roasted to form roasted coffee beans and then ground to produce roast and ground coffee powder that is filled in the capsules. Any suitable process comprising roasting can be used. As used herein, the term "roasting" includes any suitable thermal treatment of coffee beans to create flavors that are indicative of coffee. Suitable roasting techniques can include, but are not limited to, oven roasting, extrusion roasting, steam roasting (e.g., with no post roasting), infrared roasting, microwave roasting, di-electric/induction heating roasting, and combinations thereof.

The coffee beans can be roasted to any desired roast colour. The roasted coffee beans can then be ground using any coffee grinder (e.g., Probat or Matsubo grinders). Depending upon the specific particle size distribution desired in the final product of the present invention, the coffee fractions can be ground to the particle volume distributions or "grind volumes". For determining the granulometry of coffee, the particle size distribution ($D_{4,3}$) and fines level are typically determined by laser diffraction using a "Mastersizer S" instrument from Malvern®.

The system of the invention advantageously comprises an identification means ID1, ID2, ID3 (FIGS. 4 and 5) or ID4, ID5 (FIGS. 11 and 12) associatable to each capsule to ensure control of the brewing parameters, in particular, the flow rate and the volume of injected liquid in the capsule, as a function of the volume of the capsule and/or the product characteristics of the capsule (granulometry, roasting, etc.) and/or the beverage to be delivered (ristretto, espresso, lungo, large or extra-large size coffee, etc.). The system of the invention is capable of delivering different flow rates which are influenced by two key parameters: the rotational speed of the capsule in the device and the back-pressure exerted on the centrifuged liquid. For a given back-pressure, the higher the rotational speed, the larger the flow. Conversely, for a given rotational speed, the larger the back-pressure, the smaller the flow. The back-pressure can be varied by varying the closing force of a flow restriction valve placed downstream of the enclosure of the capsule and/or by varying the cross-section of the restriction outlets, such as described in co-pending patent application PCT/EP08/066666. In the context of the invention, the term "flow rate" refers to the flow of liquid, in particular water, injected in the capsule and which can be measured by any suitable means such as a flow meter and monitored by the control means.

As known per se, the control of the rotational speed is carried out by the control means selectively activating the rotational motor (not shown) which drives part of the interface assembly 13, the capsule holder 14 and the capsule together in rotation. The control of the volume of liquid injected in the capsule is carried out by the control means selectively activating the pump 11 to meter the proper volume of liquid.

In particular, the identification means can set different volumes of injected liquid for delivering different beverage volumes and/or set the rotational speed of the device. In particular, for the larger capsules in the set, the identification means can set larger liquid volumes than for smaller capsules. Also, the identification means can also set different flow rates for smaller capsules than for larger capsules and/or different rotational speeds for smaller capsules than for larger capsules in order to provide different residence time of liquid in the capsule. Preferably, the smaller the capsule or the smaller the beverage (i.e., or the volume of injected liquid in the capsule), the smaller the flow rate. Finally, the identification means may also set different back-pressure values in the capsule or at the outlet 29 where the flow restriction is positioned. Preferably, the volume of injected liquid, the rotational speed and the back-pressure in the capsule are adjustable/adjusted by the control means (C) as a function of the volume. In addition, the temperature of the injected liquid can be varied as a function of the volume of the capsule, by the control means selectively activating the liquid heater 10. For instance, the temperature of the liquid can be heated at a higher temperature for compensating the temperature losses of the liquid in larger volumes.

As illustrated in FIGS. 4 and 5, the identification means can be formed as selection means ID1, ID2, ID3 of a user interface 30. The selection means can be physical switches or any other sort of selectors such as a multi-choice interface of a touch screen. Each selector corresponds to a certain type of beverage to be delivered, e.g., a particular coffee type such as ristretto, espresso, lungo, etc., a particular volume of beverage (e.g., 25, 40, 80, 110, 250 ml, etc.) and/or a particular selection of aroma strength and/or level of foam/crema. The user interface being connected to the control means C, the brewing parameters are adjusted according to the selection made by the user of the selection means for operating the centrifugal brewing device.

In an alternative illustrated in FIGS. 11 and 12, the identification means are directly associated to the different capsules. In this case, the identification means ID4, ID5 (or more) are capsule recognition means attached to or embedded in the capsules. The recognition means can be any mechanical, optical, magnetic or radio-frequency recognition means capable of delivering information to the brewing device, via a sensing device 31, as to which type of capsule is inserted in the device. For example, the recognition means is a barcode, a colour code, a RFID tag, a magnetically sensitive element, or a mechanical key or shape.

The main benefit of controlling the adjustment of these different parameters is essentially linked to the possibility to provide a wide variety of beverages, in particular coffees, of different volumes (e.g., ristretto, espresso, lungo, americano, etc.), aroma strength and foam/crema volume. The possibilities offered by the invention exceed the traditional brewing methods where these parameters cannot be adjusted all together properly.

The invention claimed is:

1. A method for brewing a variety of coffee beverages of different volumes having different characteristics of taste, strength and crema using capsules which are centrifuged in a centrifugal brewing device, the method comprising:
providing a set of capsules having a body defining different storage volumes and containing an amount of infusible or extractable coffee ingredient that increases as a function of the storage volume of the body in the set, each capsule in the set corresponds to a flow rate or a profile of flow rate of reference and corresponds to a particular volume of injected liquid of reference;
selecting a capsule from the set of capsules and centrifuging the capsule in the centrifugal brewing device; and
adjusting a flow rate and a volume of injected liquid in the capsule to match the flow rate or the profile of flow rate of reference and the particular volume of the injected liquid of reference as a function of the storage volume of the capsule, the flow rate being controlled by a method selected from the group consisting of varying a rotational speed, varying a back-pressure exerted on a centrifuged liquid by flow restriction means pertaining to at least either the centrifugal brewing device or the capsule or positioned on both the centrifugal brewing device and the capsule, and varying both the rotational speed and the back-pressure exerted on the centrifuged liquid by the flow restriction means pertaining to at least either the centrifugal brewing device or the capsule or positioned on both the centrifugal brewing device and the capsule, and the flow rate is controlled such that the smaller the storage volume of the capsule, the smaller the flow rate.

2. The method according to claim 1, wherein the smaller the storage volume of the capsule, the smaller the volume of the injected liquid in the capsule.

3. The method according to claim 1, wherein the flow restriction means are on both the centrifugal brewing device and the capsule.

4. The method according claim 1, wherein the flow restriction means pertain to both the centrifugal brewing device and the capsule.

5. The method according to claim 1, wherein the centrifuging of the capsule in the centrifugal brewing device forces the injected liquid to traverse the infusible or extractable coffee ingredient and then leave the capsule as one of the coffee beverages of different volumes having different characteristics of taste, strength and crema.

6. The method according to claim 1, comprising varying a temperature of the injected liquid as a function of the storage volume of the capsule.

7. A method for brewing a variety of coffee beverages of different volumes having different characteristics of taste, strength and crema using capsules which are centrifuged in a centrifugal brewing device, the method comprising:
providing a set of capsules having a body defining different storage volumes and containing an amount of infusible or extractable coffee ingredient that increases as a function of the storage volume of the body in the set, each capsule in the set corresponds to a flow rate or a profile of flow rate of reference and corresponds to a particular volume of injected liquid of reference;

selecting a capsule from the set of capsules and centrifuging the capsule in the centrifugal brewing device;

adjusting a flow rate and a volume of injected liquid in the capsule to match the flow rate or the profile of flow rate of reference and the particular volume of injected liquid of reference as a function of the storage volume of the capsule, the flow rate being controlled by varying both a rotational speed and a back-pressure exerted on a centrifuged liquid by flow restriction means positioned on both the centrifugal brewing device and the capsule, and the flow rate is controlled such that the smaller the storage volume of the capsule, the smaller the flow rate; and the centrifuging of the capsule in the centrifugal brewing device forces the injected liquid to traverse the infusible or extractable coffee ingredient and then leave the capsule as one of the coffee beverages of different volumes having different characteristics of taste, strength and crema.

8. The method according to claim 1, wherein the flow rate is controlled at least partially by varying the back-pressure exerted on the centrifuged liquid using a mechanism selected from the group consisting of (i) a spring-biased valve downstream of an enclosure of the capsule and (ii) varying a cross-section of restriction outlets based on the storage volume of the capsule.

* * * * *